(12) United States Patent
Forster

(10) Patent No.: US 7,083,014 B2
(45) Date of Patent: Aug. 1, 2006

(54) DRIVE DEVICE FOR A MACHINE WITH A TRACTION DRIVE SYSTEM AND A HYDRAULIC WORK SYSTEM

(75) Inventor: Franz Forster, Karlstadt-Mühlbach (DE)

(73) Assignee: Linde Aktiengesellschaft, Wiesbaden (DE)

( * ) Notice: Subject to any disclaimer, the term of this patent is extended or adjusted under 35 U.S.C. 154(b) by 166 days.

(21) Appl. No.: 10/014,885

(22) Filed: Dec. 11, 2001

(65) Prior Publication Data

US 2002/0092687 A1 Jul. 18, 2002

(30) Foreign Application Priority Data

Dec. 18, 2000 (DE) .............................. 100 63 167.3

(51) Int. Cl.
*B60K 25/00* (2006.01)
(52) U.S. Cl. ........................ 180/53.4; 180/65.1; 180/65
(58) Field of Classification Search ............... 180/65.2, 180/65.5, 53.4, 53.5, 53.6, 308, 307
See application file for complete search history.

(56) References Cited

U.S. PATENT DOCUMENTS

| | | | | |
|---|---|---|---|---|
| 3,153,900 A | * | 10/1964 | Pigeroulet et al. ............. | 60/433 |
| 3,687,212 A | * | 8/1972 | Forster ....................... | 180/53.4 |
| 3,700,060 A | * | 10/1972 | Keene et al. ................. | 180/165 |
| 3,780,820 A | * | 12/1973 | Schwab et al. ............... | 180/243 |
| 3,812,928 A | * | 5/1974 | Rockwell et al. ............. | 180/65.5 |
| 3,865,207 A | * | 2/1975 | Schwab et al. ............... | 180/253 |
| 3,949,824 A | * | 4/1976 | Bennett ........................ | 180/62 |
| 4,023,641 A | * | 5/1977 | Ganoung ...................... | 180/307 |
| 4,133,403 A | * | 1/1979 | Priddy et al. ............... | 180/65.2 |
| 4,180,138 A | * | 12/1979 | Shea .......................... | 180/65.2 |
| 4,318,197 A | * | 3/1982 | Drozd .......................... | 14/71.5 |
| 4,570,741 A | * | 2/1986 | McCoy ........................ | 180/242 |
| 4,583,609 A | * | 4/1986 | Anderson et al. .......... | 180/65.5 |
| 4,629,950 A | * | 12/1986 | Ching ......................... | 318/285 |
| 4,763,751 A | * | 8/1988 | Gardner, Jr. ................ | 180/305 |
| 4,776,415 A | * | 10/1988 | Brice .......................... | 180/11 |
| 4,799,564 A | * | 1/1989 | Iijima et al. ................ | 180/65.5 |
| 5,005,659 A | * | 4/1991 | Jones et al. ................. | 180/65.1 |
| 5,014,800 A | * | 5/1991 | Kawamoto et al. ........ | 180/65.5 |
| 5,064,013 A | * | 11/1991 | Lenz .......................... | 180/65.3 |
| 5,127,485 A | * | 7/1992 | Wakuta et al. ............. | 180/65.5 |
| 5,156,579 A | * | 10/1992 | Wakuta et al. ............. | 475/161 |
| 5,289,905 A | * | 3/1994 | Braschler .................... | 188/296 |
| 5,813,487 A | * | 9/1998 | Lee et al. ................... | 180/65.1 |
| 5,964,473 A | * | 10/1999 | Degonda et al. ......... | 280/250.1 |
| 6,354,388 B1 | * | 3/2002 | Teal et al. ................... | 180/6.2 |
| 6,386,553 B1 | * | 5/2002 | Zetterstrom ................ | 280/5.51 |
| 6,537,167 B1 | * | 3/2003 | Gazyakan et al. ............ | 475/5 |
| 6,571,896 B1 | * | 6/2003 | Roberts ....................... | 180/65.1 |

* cited by examiner

*Primary Examiner*—Christopher P. Ellis
*Assistant Examiner*—Bridget Avery
(74) *Attorney, Agent, or Firm*—The Webb Law Firm

(57) ABSTRACT

A drive device is provided for a machine with a traction drive system and a hydraulic work system. The traction drive system has a drive axle and the hydraulic system has at least one electric motor and at least one pump driven by the electric motor. The electric motor and/or the pump are integrated into the drive axle or are located directly on the drive axle. In one configuration, the drive axle has two traction motors located on the ends of the drive axle. The electric motor and/or the pump are located axially between the traction motors. Downstream of the pump of the hydraulic work system there is a valve control device which is integrated into the drive axle or is fastened to the outside of the axle housing in the vicinity of the pump.

23 Claims, 4 Drawing Sheets

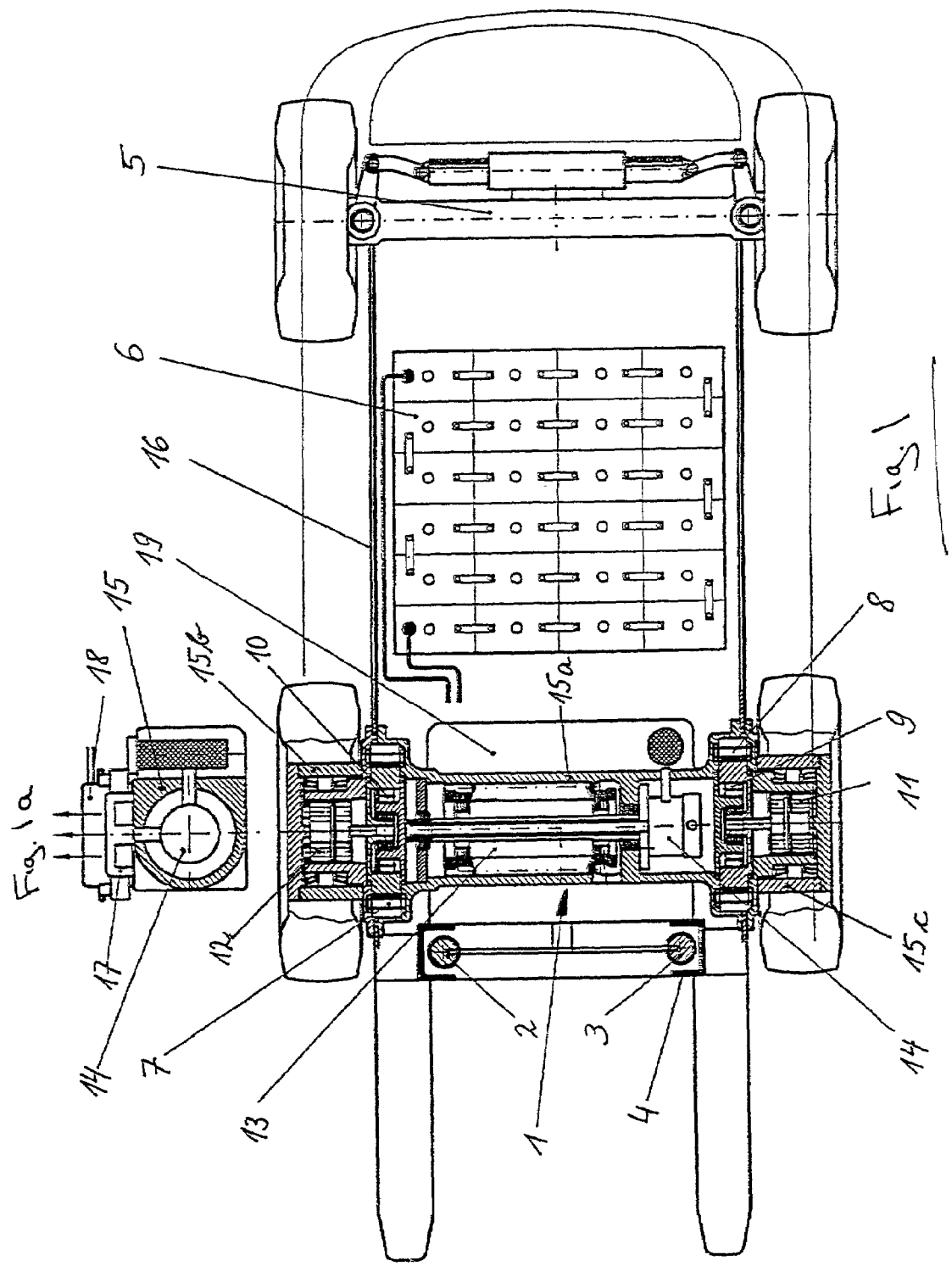

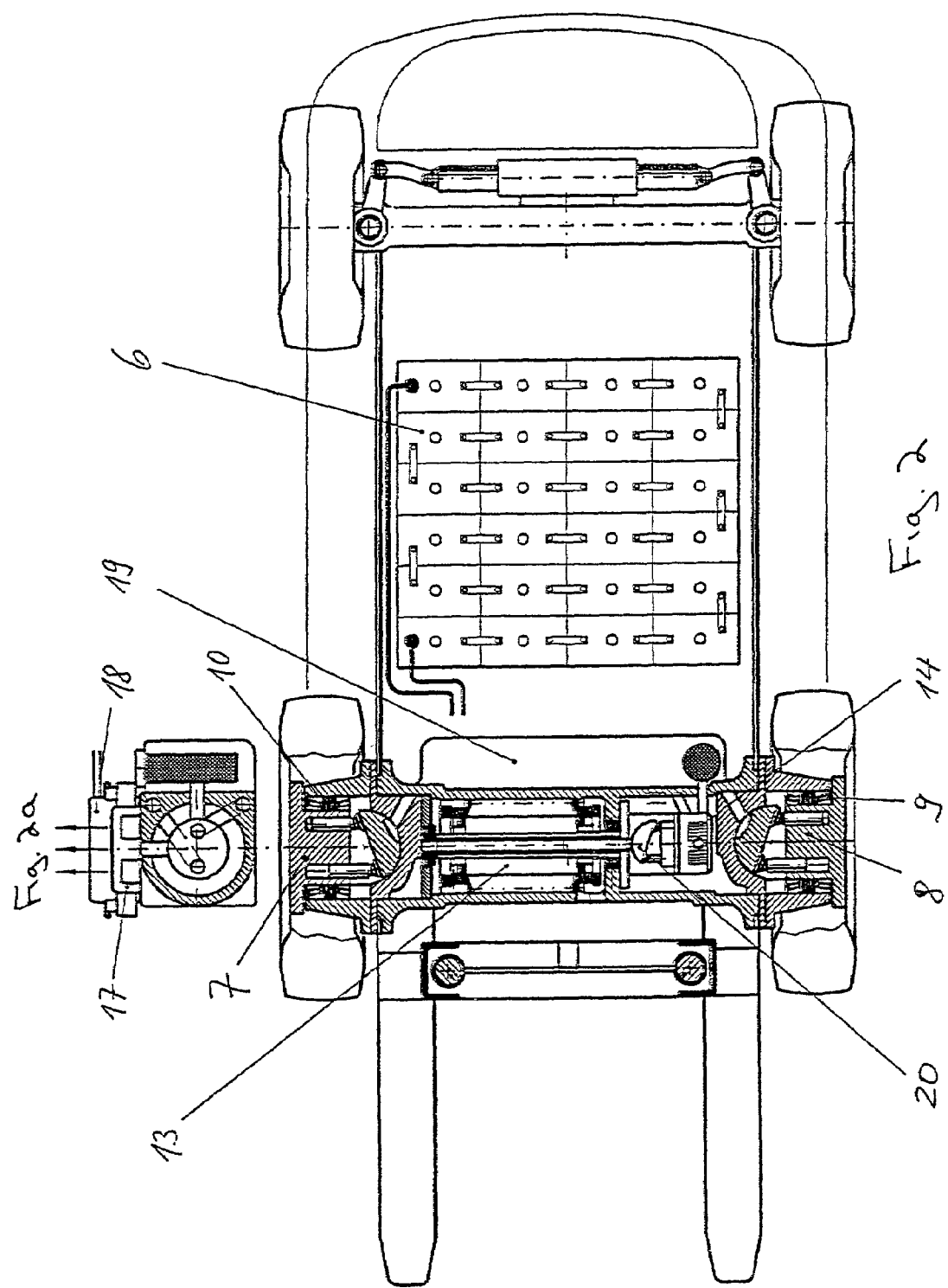

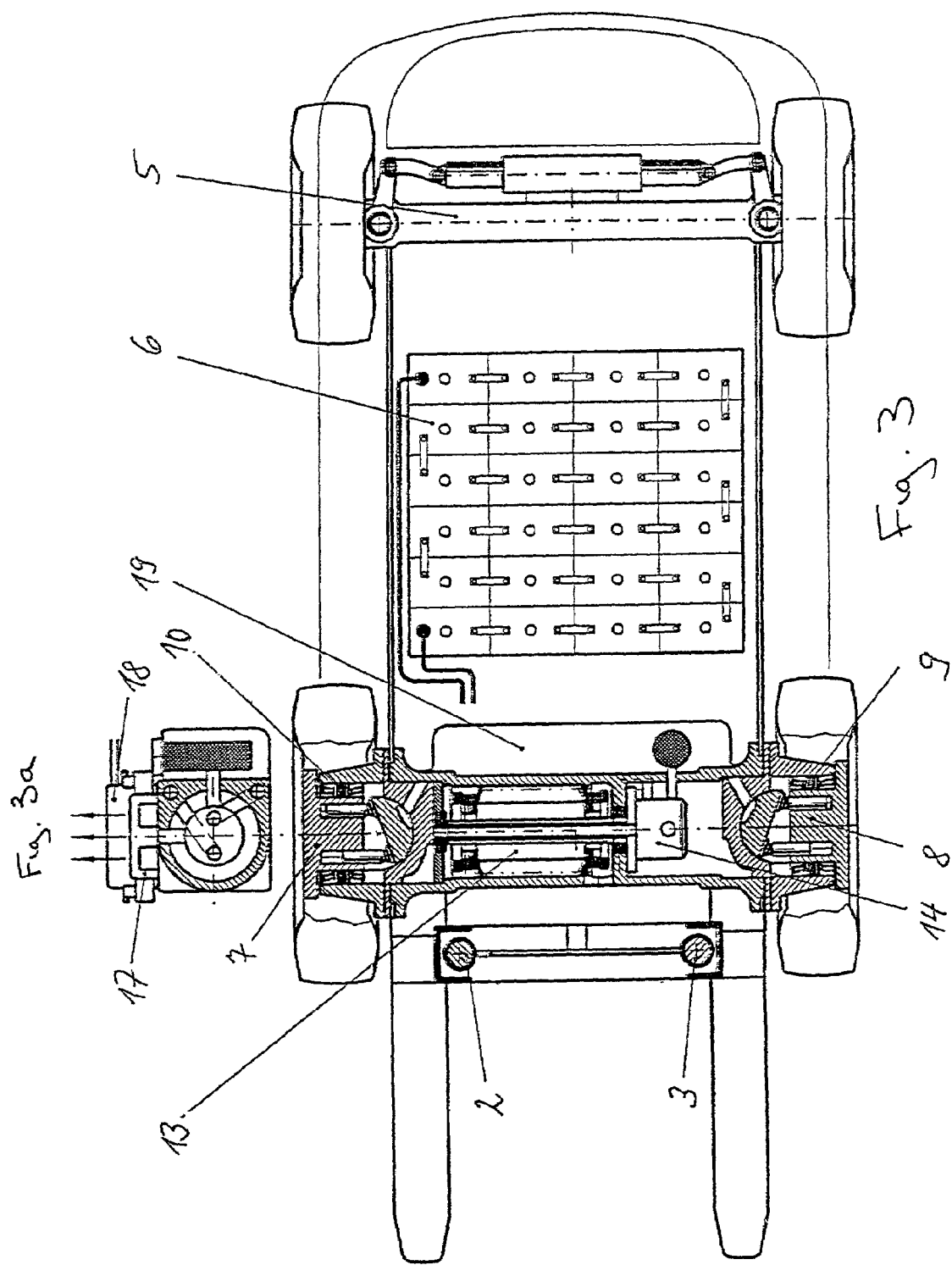

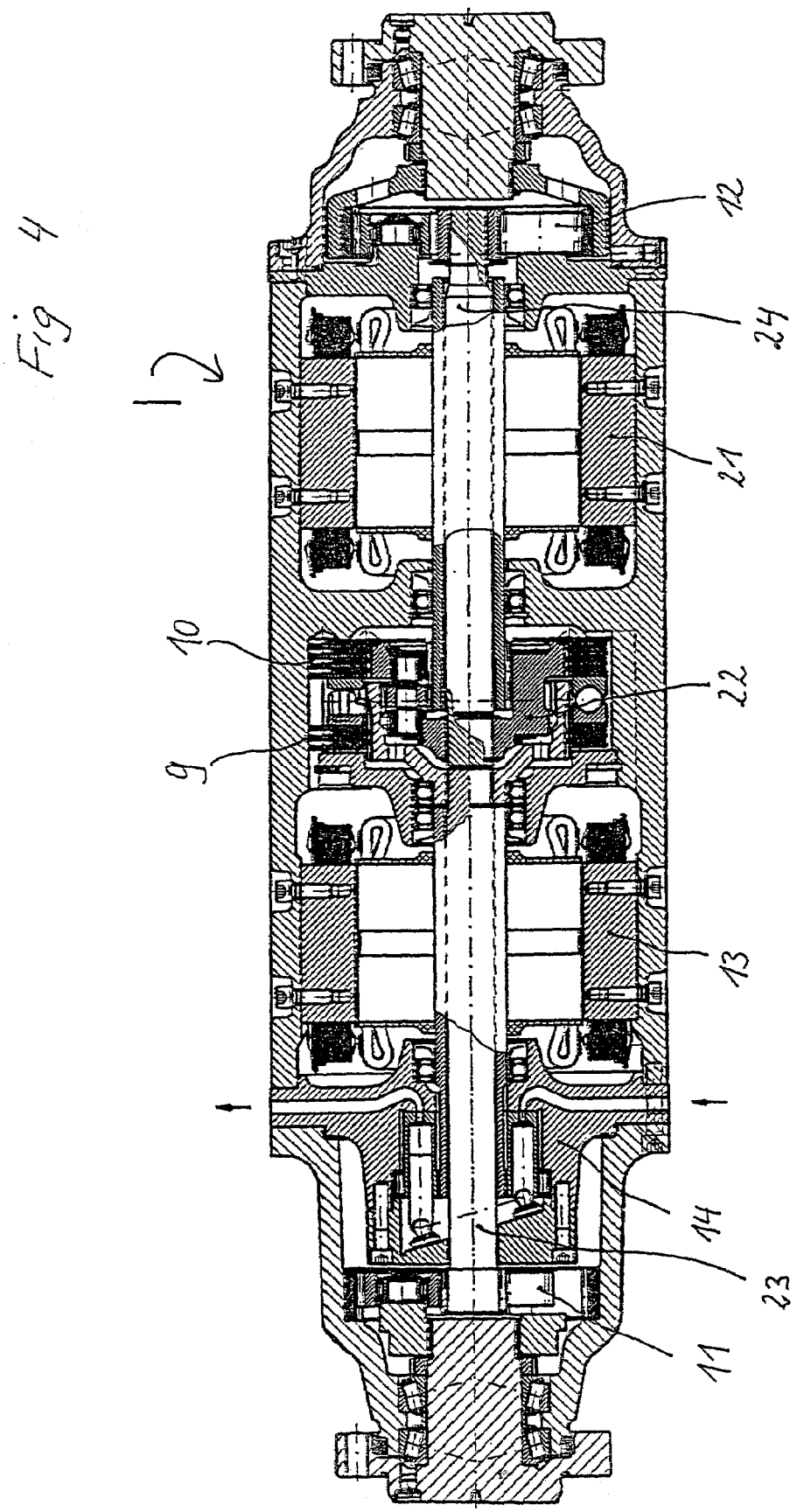

DRIVE DEVICE FOR A MACHINE WITH A TRACTION DRIVE SYSTEM AND A HYDRAULIC WORK SYSTEM

CROSS-REFERENCE TO RELATED APPLICATION

This application corresponds to German Application No. 100 63 167.3 filed Dec. 18, 2000, which is herein incorporated by reference in its entirety.

BACKGROUND OF THE INVENTION

1. Field of the Invention

This invention relates generally to a drive device for a machine with a traction drive system and a hydraulic work system in which the traction drive system has a drive axle and the hydraulic work system has at least one electric motor and at least one pump that is driven by the electric motor.

2. Technical Considerations

The term "machine" as used in this document is to be understood as including all machines that, in addition to a primary user which can be driven electrically or hydraulically, hydraulically drive at least one additional user.

Drive devices are used, for example, in industrial trucks that are powered by electric storage batteries. The term "hydraulic work system" as used in this document relates not only to the users of hydraulic energy in machines, the function of which is visible on the outside (such as the hoisting cylinder and tilting cylinders of a fork lift truck) but also to hydraulic users inside the vehicle, the workings of which are to a certain extent hidden (such as a hydraulic steering system, for example).

An object of this invention is to reduce the cost of construction and the space required for the installation of drive devices such as those described above.

SUMMARY OF THE INVENTION

The invention provides a drive device in which the electric motor and/or the pump of the hydraulic work system are integrated into the drive axle or are located directly on the drive axle.

In one aspect of the invention, the principle components of the traction drive system and the hydraulic work system that were previously spatially separated from each other are combined into a single modular unit. This arrangement has significant advantages. For example, space in the machine is saved by the relocation of the electric motor and/or of the pump of the hydraulic work system into the drive axle of the traction drive system, or directly onto the drive axle. In machines that are driven by a rechargeable electric battery, the space thereby made available can be used to increase the size and volume of the battery, among other things.

It is also possible that components of the drive device of the invention can be used both for the traction drive system and for the hydraulic work system. For example, the electric motor no longer requires its own housing if the housing of the drive axle is also used to house the electric motor. This arrangement drastically reduces the time and effort involved in manufacturing and assembly and leads to reduced manufacturing costs.

The invention teaches that it is possible either to integrate the electric motor with the pump into the drive axle, or to locate both of them directly on the drive axle. It is also possible to integrate only the electric motor or only the pump into the drive axle and to locate the respective other component outside, but directly on the drive axle.

Of course, it is within the context of the invention to integrate into the drive axle a plurality of pumps that are associated with the hydraulic work system, as well as a plurality of electric motors that are provided to drive the pumps, or to locate them directly on the drive axle.

In one embodiment of the invention, the drive axle has two traction motors, thereby providing an all-wheel drive system. A differential transmission to compensate for different speeds of rotation of the wheels as the vehicle travels around curves is therefore unnecessary. The all-wheel drive can be controlled for travel around curves. The construction with two traction motors described above results in an efficient utilization of space if the traction motors are located on the ends of the drive axle and the electric motor and/or the pump are located axially between the traction motors.

In one embodiment of the invention, the traction motors are electric motors (FIG. 1), in which case the drive device theoretically represents an electro-axle, which is not only a principle component of a traction drive system but, as taught by the invention, is also an important component of a hydraulic work system.

In an additional configuration of the invention, the traction motors are disc rotor electric motors. The space required by the electric traction motors, in particular in the axial direction, is thereby minimized and space is created for the installation of the units of the hydraulic work system.

In an additional but no less advantageous configuration, the traction motors are hydraulic motors, such as hydraulic motors with secondary regulation systems. The hydraulic motors can be fed either by a separate traction pump (FIG. 2) or by the pump of the hydraulic work system (FIG. 3). The separate traction pump can be driven by its own electric motor or by the electric motor of the hydraulic work system.

In one development of the invention, if the hydraulic motors and the hydraulic work system are driven by a common pump, it is thereby sufficient to design the installed delivery volume of the pump so that it provides the volume required by the hydraulic work system. This arrangement utilizes the knowledge that in practice, the vehicle traction drive system is generally not operated at high speed at the same time the hydraulic work system is operated at a high working speed. As a general rule, the hydraulic work system is not activated when the vehicle is traveling at high speed. Typically, the vehicle is either not traveling at all or the speed of travel is low when the hydraulic work system is being operated at a high working speed. Approximately all of the oil that is transported by the pump is therefore fed to the hydraulic work system or to the traction drive system. Although the amount of oil delivered by the pump is designed to meet the requirements of the hydraulic work system and is therefore not very large overall, the secondary regulation of the traction motors achieves a sufficient speed of travel of the machine.

The efficiency of the machine is optimized when the pump is sized as taught by the invention. The power loss of the drive system is thereby significantly reduced. The pipelines, fittings, and hoses can also be smaller. Finally, the noise level of the hydraulic system is also reduced.

To make possible overlaps between traction movements and work movements in boundary areas, in one advantageous configuration of the invention, the installed delivery capacity of the pump is greater than the maximum quantity required by the hydraulic work system. This measure makes it possible, for example when the hydraulic work system is being operated at a high working speed, to still be able to move the machine at a low speed of travel (e.g., for maneuvering or parking) without previously having to reduce the working speed of the hydraulic work system. Conversely, at a high speed of travel, the hydraulic work system can still be operated at a slow work speed without having to previously reduce the speed of travel. The excess can also be used to operate a hydraulic auxiliary or booster system.

The invention teaches that it is advantageous, in particular when electric traction motors are used, if a reducing transmission is installed downstream of each traction motor. Traction motors that run at a high speed can thereby be used, the speed of rotation of which is reduced by the reducing transmissions. As a result of which, the drive torque that is transmitted to the wheels of the drive axle is simultaneously increased. The traction motors can therefore be very small. A particularly compact arrangement is possible if the reducing transmissions are planetary gear trains.

In an additional realization of the invention, the drive axle has a single traction motor (FIG. 4). The traction motor preferably interacts with a downstream differential transmission and drives both wheels, optionally via a reducing transmission. The individual traction motor (hydraulic or electric) can be integrated into the drive axle together with the electric motor of the hydraulic work system and/or the pump of the hydraulic work system. In that case, the electric motor and optionally the pump of the hydraulic work system are penetrated, preferably coaxially, by an output shaft of the differential transmission.

It is also possible that the electric motor of the hydraulic work system can be provided in the form of an electric traction motor of the traction drive system. In that case, the drive device taught by the invention has only one single electric motor that drives both the traction drive system and the hydraulic work system. In this case, appropriate control devices provide for a splitting of the output between the traction drive system and the hydraulic work system and thus for the desired distribution of the flow of power.

The drive axle advantageously also has an axle housing that is substantially closed all around for connection with the vehicle frame, inside which axle housing can be located the electric motor and/or the pump of the hydraulic work system. If both the electric motor and the pump are integrated into the drive axle, they can be oriented coaxially.

The installation and removal of the individual components of the drive device of the invention into the axle housing and the installation of the drive axle into the machine is facilitated if the axle housing has a housing middle segment and two housing end segments that are detachably fastened to it. In this case, the electric motor and/or the pump of the hydraulic work system are advantageously located in the middle segment of the housing, where the traction motors can also be located. The reducing transmissions can be advantageously located in the housing end segments.

In one particularly advantageous embodiment of the invention, when the drive axle is installed, at least one housing end segment can be removed from the housing middle segment without having to remove the drive axle from the vehicle frame, whereby the interior of the housing middle segment is accessible after the removal of the housing end segment. Maintenance or repair work on the components of the traction drive system and the components of the hydraulic drive system that are integrated into the drive axle can thereby be performed when the drive axle is installed.

In one embodiment of the invention, the electric motor of the hydraulic work system and optionally the traction motors that are in the form of electric motors are advantageously oil-cooled and are in communication with the oil circuit of the hydraulic work system. In that case, the fan of the electric motor that supplies air cooling can thereby be eliminated and sufficient quantities of thermal energy can still be removed when the electric motor is operating at low speeds of rotation. An oil cooling can be realized simply because the pump of the hydraulic work system is located immediately next to the electric motor. The diameter of an oil-cooled electric motor can be very small. The diameter of the drive axle can also be minimized in this area, thereby achieving the greatest possible ground clearance of a machine that is equipped with the drive device of the invention. When the drive device of the invention is used in a fork-lift truck, it is also possible to reduce the size of the nose of the truck, i.e., the distance between the lifting frame and the tipping axis, which generally runs through the drive axle.

In one advantageous development of the invention, a control for at least one electric motor is fastened to the outside of the axle housing, e.g., the control for the electric motor of the hydraulic work system and optionally for the electrical traction motor(s). On one hand, it is thereby possible to keep the electric lines between the control and the electric motor short and, on the other hand, the control system, the temperature of which increases during operation, can discharge its thermal energy to the axle housing.

The discharge of thermal energy can be improved if the control is oil-cooled. In that case, the oil cooling system of the electric motor can be used to remove heat simultaneously from the electric motor and the thermally conducting axle housing.

If a valve control device is connected downstream of the pump of the hydraulic work system, which valve control device is integrated into the drive axle or is fastened to the outside of the axle housing in the vicinity of the pump, the connection paths between the valve control device and the pump are short.

An oil tank connected to the hydraulic work system and integrated into the drive axle or located immediately adjacent to the drive axle makes possible a short intake path to the pump.

Only a few electrical and hydraulic lines need to be connected to the drive device of the invention to supply energy to the electric motor and to supply oil under pressure to the hydraulic work system.

The advantages of the invention can be utilized to particular advantage if the machine is an industrial truck, in particular a fork lift truck, that is powered by an electric battery or an electric fuel cell. In that case, the hydraulic lifting system and optionally additional users can be connected to the pump(s).

BRIEF DESCRIPTION OF THE DRAWINGS

Additional details and advantages of the invention are explained in greater detail below with reference to the exemplary embodiments illustrated in the accompanying schematic drawings in which like reference numbers identify like parts throughout.

FIG. 1 is a schematic bottom view of a machine in the form of a fork lift truck powered by an electric battery and shows the drive axle in longitudinal section, the drive axle having an electric motor for the hydraulic work system and two electric traction motors;

FIG. 1a is a cross section of the drive axle of FIG. 1;

FIG. 2 is a schematic bottom view of a fork lift truck similar to FIG. 1 in which the drive axle has two hydraulic traction motors which are connected to a separate traction pump;

FIG. 2a is a cross section of the drive axle of FIG. 2;

FIG. 3 is a schematic bottom view of a fork lift truck similar to FIG. 1 in which the drive axle has two hydraulic traction motors which are connected to the pump of the hydraulic work system;

FIG. 3a is a cross section of the drive axle of FIG. 3; and

FIG. 4 is a longitudinal section through a drive axle of a machine of the invention, which in addition to the electric motor of the hydraulic work system has an electric traction motor and a downstream differential transmission.

DESCRIPTION OF THE PREFERRED EMBODIMENTS

The general concepts of the invention will now be described with particular reference to a machine having a traction drive system and a hydraulic work system. As shown in FIG. 1, the traction drive system includes a front drive axle 1. The hydraulic work system includes hoisting cylinders 2 and 3 of a lifting frame 4 that is located forward of the drive axle 1 (as well as the tilting cylinder, which is not shown in FIG. 1, and optional additional users of hydraulic energy, such as a hydraulic steering system, for example).

Between the drive axle 1 and a rear steering axle 5 there is a battery block 6 in the form of an energy storage system. A fuel cell can also optionally be used.

The drive axle 1 has traction motors 7 and 8 in its respective end areas which, in the exemplary embodiment illustrated in FIG. 1, are in the form of electric motors that employ a disc rotor design and drive a front wheel (optionally also a tandem wheel). Inside the traction motors 7 and 8 are respective brakes 10 and 9. Downstream of the traction motors 7 and 8 are respective reducing transmissions 12 and 11, which can be in the form of planetary gear trains.

Integrated into the drive axle 1 are an electric motor 13 and a pump 14 that is driven by the electric motor 13, which are provided for the drive of the hydraulic work system (e.g., in the illustrated exemplary embodiment for the drive of at least the hoisting cylinders 2 and 3). In another possible arrangement of the above mentioned drive components of the hydraulic work system, only the electric motor 13 is integrated into the drive axle 1, while the pump 14 is located outside the drive axle 1 and can be oriented, for example, at a right angle to the axis of rotation of the electric motor 13. The pump 14 can thereby be connected with the electric motor 13 by a bevel wheel gear. It is also possible to locate both components of the hydraulic work system, i.e., the electric motor 13 and the pump 14, outside the drive axle 1 but directly on it, e.g., to flange-mount them on the drive axle 1 or to connect them with the drive axle 1 in another suitable manner and to thereby achieve a compact modular unit.

In the exemplary embodiment of FIG. 1, the electric motor 13 and the pump 14 of the hydraulic work system, together with the two traction motors 7 and 8, are located in a middle segment 15a of an axle housing 15 of the drive axle 1. The axle housing 15 is closed on all sides and is connected with a vehicle frame 16 directly or indirectly by elastic intermediate elements. On both sides of the housing middle segment 15a there are housing end segments 15b and 15c, which are detachably fastened to the housing middle segment 15a and in which the reducing transmissions 11 and 12 are located. To a certain extent, the housing end segments 15b and 15c each form a wheel head which projects into a rim of the front wheel.

This design makes it possible, after the removal of one or both housing end segments 15b, 15c, to perform maintenance and repair activities on the modular units of the traction drive system (reducing transmissions 11, 12) located inside the housing end segments 15b, 15c, as well as the modular units of the traction drive system (traction motors 7, 8; brakes 9, 10) and of the hydraulic work system (electric motor 13 and/or pump 14) located inside the housing middle segment 15a, without previously having to completely remove the drive axle 1 from the vehicle frame 16. Nor does the lifting frame 4 have to be removed.

The electric motor 13 can be oil-cooled, and for this purpose can be connected to the hydraulic circuit of the pump 14, i.e., advantageously to the intake side of the pump or to the return. Therefore, the electric motor 13 does not need a fan and can be realized with a small diameter. Optionally or in addition thereto, the electric traction motors 7, 8 can also be oil-cooled. In the exemplary embodiment illustrated in FIG. 1, the pump 14 of the hydraulic work system is located axially next to the electric motor 13 and is a constant displacement pump (e.g., a gear pump). In addition to the above mentioned capability of locating the pump 14 outside the drive axle 1, the pump 14 can also be located inside the electric motor 13, for example, if additional pumps are also to be driven (for the hydraulic work system or for a supplemental hydraulic system), or if the overall length must be reduced. It is also possible to configure the pump 14 in the form of a variable displacement pump, e.g., in the form of a hydrostatic axial piston engine employing a swashplate design.

A valve control device 17 (e.g., a valve block) which is connected to the pump 14 to supply the lifting cylinders 2 and 3 and optionally tilting cylinders and additional users of hydraulic energy is located on the outside of the axle housing 15 of the drive axle 1 in the vicinity of the pump 14 (FIG. 1a).

The speed of rotation of the electric motors 13, 7 and 8 can be variable. A control system 18 of the electric motors 13, 7 and 8 provided for this purpose can also be attached to the outside of the axle housing 15. The heat generated in the control system 18 can be discharged via the axle housing 15, and the cooling action can be optionally enhanced by oil cooling. In that case, the control system 18 can also be indirectly oil-cooled.

The electric motors 13, 7 and 8 can be three-phase induction motors, for example. In that case, it is also possible to provide an energy recovery system from the hydraulic work system (when the lifting cylinders 2 and 3 are lowered) and/or from the traction drive system (brakes), to extend the length of time between rechargings of the battery block 6.

Behind the drive axle 1 in the direction of travel there is an oil tank 19 for the hydraulic circuit of the hydraulic work system (and optionally of the traction drive system), which can be fastened to the axle housing 15 of the drive axle 1. The intake path of the pump 14 is therefore short.

As illustrated in FIGS. 2, 2a, 3, and 3a, it is also within the teaching of the invention to configure the traction motors 7 and 8 as hydraulic motors and to feed them by a pump 20 (see FIG. 2) or the pump 14 (see FIG. 3) (electro-hydraulic axle).

In the first case described above (FIG. 2), the traction pump 20, which can be a variable displacement axial piston machine employing a swashplate design, can be driven by the electric motor 13, which also drives the pump 14 of the hydraulic work system. It is thereby appropriate if there are two hydraulic circuits that are separate from each other so that the maximum pressure level in the hydraulic work system can differ from the maximum pressure level in the hydraulic traction system.

The traction motors 7 and 8, which can also be hydrostatic axial piston engines that employ a swashplate design, can have constant or variable intake volumes. The connecting lines between the traction pump 20 and the traction motors 7 and 8 can be integrated into the axle housing 15. There is no need for reducing transmissions if the traction motors 7, 8 are low-speed motors.

In the latter case described above (FIG. 3), the delivery volume of the pump 14, which then feeds both the hydraulic work system as well as the (hydrostatic) traction drive system, is designed for the maximum volume required by the hydraulic work system. The hydraulic traction motors 7 and 8 can have a variable intake volume and a secondary regulation system.

Under normal conditions, when the delivery flow available from the pump 14 is used for the traction drive system, only a slow speed of movement can be achieved, which corresponds to the relatively small maximum delivery of the pump 14. As a result of the secondary regulation system of the traction motors (hydraulic motors) 7 and 8, however, the volume made available by the pump 14, which is designed for only the requirements of the hydraulic work system, can be used to achieve a wider range of traction speeds. It is thereby advantageous that it is generally unnecessary to run a fork lift truck at high speed and simultaneously operate the hydraulic work system at a high speed. For example, when the machine is traveling at high speed, the lifting cylinders 2 and 3 are generally not actuated. On the other hand, when the lifting cylinders 2 and 3 are operating at high speed, the truck should generally be moved either very slowly or not at all for safety reasons (maneuvering or parking, for example).

The fact that the delivery volume of the pump 14 is greater than the amount required by the hydraulic work system, for example by 10–20%, makes it possible to operate the hydraulic work system at slow working speeds even in the range of high speeds of travel without having to first reduce the speed of travel.

In the embodiment of the invention illustrated in FIG. 4, the drive axle 1 for the traction drive system has a single electric traction motor 21 which is located together with the electric motor 13 of the hydraulic work system in the axle housing 15. The traction motor 21 drives a downstream differential transmission 22 which, in the illustrated exemplary embodiment, is located axially between the traction motor 21 and the electric motor 13 of the hydraulic work system and can be a planetary gear differential. The two reducing transmissions 11 and 12 located on the axle ends are driven by the output shafts 23 and 24 of the differential transmission 22. The output shaft 23 runs centrally through the electric motor 13 and the pump 14 located axially between the electric motor 13 and the reducing transmission 11, while the output shaft 24 runs centrally through the electric traction motor 21. This arrangement is possible as a result of the use of hollow shafts in the above mentioned units. In this exemplary embodiment, the brakes 9, 10 are located in the vicinity of the differential transmission 22.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A fork lift truck drive device, the drive device comprising:
   a traction drive system having a drive axle with at least one drive wheel located on each end of the drive axle, wherein the drive axle has an axle housing that is substantially closed on all sides and is provided for connection with a vehicle frame; and
   a hydraulic work system comprising at least one of a hoisting cylinder, a tilting cylinder, or a hydraulic steering system, the hydraulic work system comprising at least one electric motor and at least one pump driven by the electric motor,
   wherein at least one of the electric motor and the pump of the hydraulic work system is located inside the axle housing.

2. The drive device as claimed in claim 1, wherein the drive axle has two traction motors.

3. The drive device as claimed in claim 1, wherein the drive axle has a single traction motor.

4. The drive device as claimed in claim 1, wherein the drive axle includes at least one traction motor, wherein at least one of the electric motor of the hydraulic work system and the traction motor of the traction drive system is an oil-cooled electric motor and is connected with an oil circuit of the hydraulic work system.

5. The drive device as claimed in claim 1, wherein a control of at least one electric motor or traction motor is fastened to the outside of the axle housing.

6. The drive device as claimed in claim 1, including a valve control device installed on the pump of the hydraulic work system, which valve control device is integrated into the drive axle or is fastened to the outside of an axle housing in the vicinity of the pump.

7. The drive device as claimed in claim 1, including an oil tank connected to the hydraulic work system and integrated into the drive axle or located immediately next to the drive axle.

8. The drive device as claimed in claim 1, wherein the fork lift truck is powered by an electric storage battery or by an electric fuel cell.

9. The drive device as claimed in claim 2, wherein the traction motors are located on the ends of the drive axle and at least one of the electric motor and the pump of the hydraulic work system is located axially between the traction motors inside the axle housing.

10. The drive device as claimed in claim 2, wherein the traction motors are electric motors.

11. The drive device as claimed in claim 2, wherein the traction motors are hydraulic motors having secondary regulation systems.

12. The drive device as claimed in claim 2, including a reducing transmission installed downstream of each traction motor.

13. The drive device as claimed in claim 3, wherein the electric motor of the hydraulic work system is provided as the traction motor of the traction drive system.

14. The drive device as claimed in claim 5, wherein the control is oil-cooled.

15. The drive device as claimed in claim 10, wherein the traction motors are electric disc rotor motors.

16. The drive device as claimed in claim 11, wherein an installed delivery capacity of the pump is designed to deliver a volume of fluid required by the hydraulic work system.

17. The drive device as claimed in claim 12, wherein the reducing transmissions are planetary gear trains.

18. A drive device for a machine, the drive device comprising:
- a traction drive system having a drive axle; and
- a hydraulic work system comprising at least one of a hoisting cylinder, a tilting cylinder, or a hydraulic steering system comprising at least one electric motor and at least one pump driven by the electric motor,
- wherein at least one of the electric motor and the pump are integrated into the drive axle or are located directly on the drive axle,
- wherein the drive axle has two traction motors,
- wherein the traction motors are hydraulic motors having secondary regulation systems, and
- wherein the traction motors are connected to the pump of the hydraulic work system, and the installed delivery capacity of the pump is in excess of a maximum amount required by the hydraulic work system.

19. A drive device for a machine, the drive device comprising:
- a traction drive system having a drive axle; and
- a hydraulic work system having at least one electric motor and at least one pump driven by the electric motor,
- wherein at least one of the electric motor and the pump are integrated into the drive axle or are located directly on the drive axle,
- wherein the drive axle has an axle housing that is substantially closed on all sides and is provided for connection with a vehicle frame, and wherein at least one of the electric motor and the pump of the hydraulic work system are located inside the housing, and
- wherein the axle housing has a housing middle segment and two housing end segments that are detachably fastened to the middle segment.

20. The drive device as claimed in claim 19, wherein at least one of the electric motor and the pump of the hydraulic work system are located in the housing middle segment.

21. The drive device as claimed in claim 19, wherein the drive axle has two traction motors and the traction motors are located in the housing middle segment.

22. The drive device as claimed in claim 19, including reducing transmissions located in the housing end segments.

23. The drive device as claimed in claim 19, wherein when the drive axle is installed, at least one housing end segment can be removed from the housing middle segment without removing the drive axle from the vehicle frame, whereby an interior of the housing middle segment is accessible after removal of the housing end segment.

* * * * *